O. G. RIESKE.
PIN-FEATHER PLUCKING MACHINE.
APPLICATION FILED NOV. 29, 1915.

1,220,458.

Patented Mar. 27, 1917.
2 SHEETS—SHEET 1.

WITNESSES
G. F. Williamson
E. C. Skinkle

INVENTOR
O. G. RIESKE
BY HIS ATTORNEYS
Williamson & Merchant

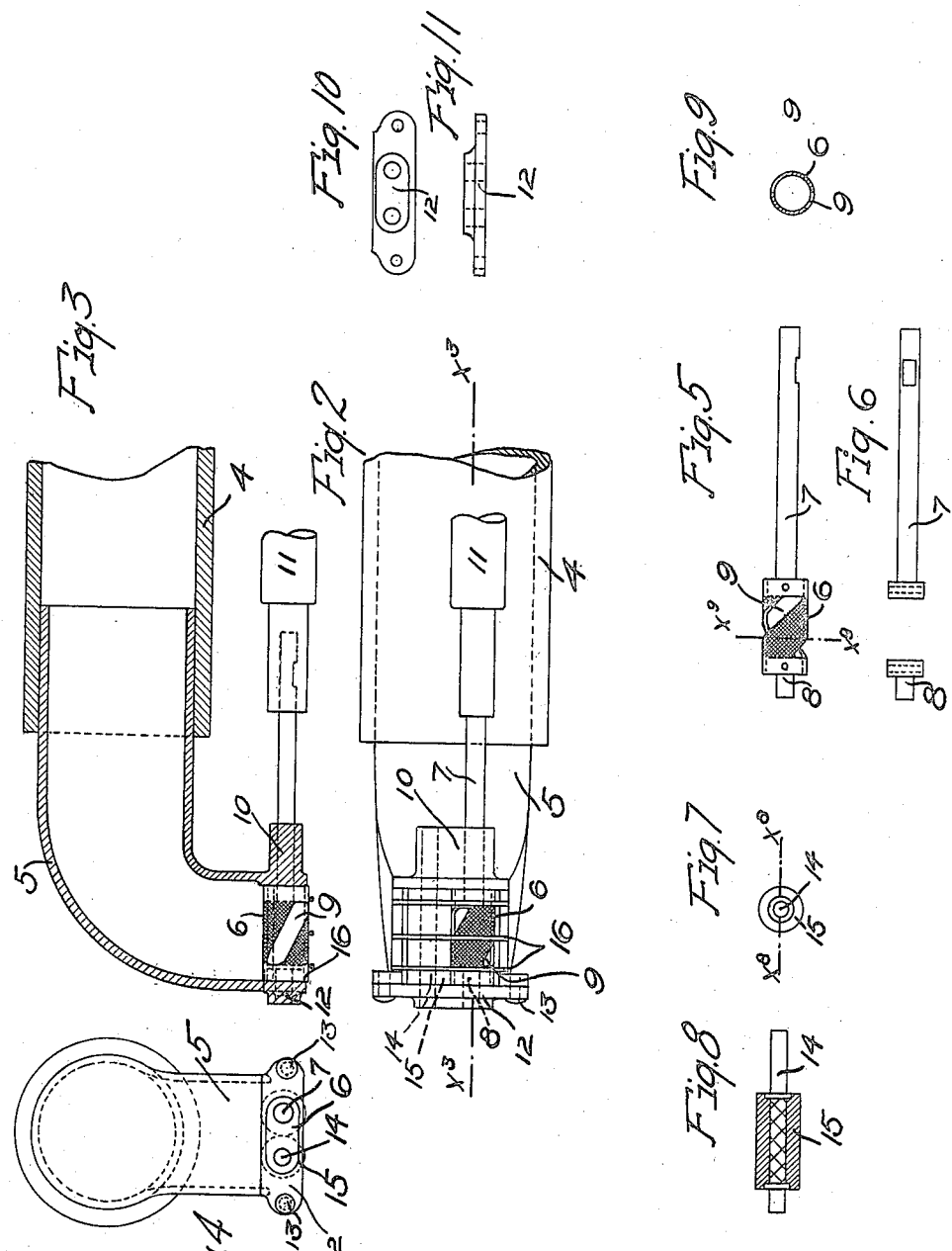

UNITED STATES PATENT OFFICE.

OTTO G. RIESKE, OF TORONTO, ONTARIO, CANADA.

PIN-FEATHER-PLUCKING MACHINE.

1,220,458.

Specification of Letters Patent. Patented Mar. 27, 1917.

Application filed November 29, 1915. Serial No. 64,103.

*To all whom it may concern:*

Be it known that I, OTTO G. RIESKE, a citizen of the United States, residing at Toronto, in the Province of Ontario, Canada, have invented certain new and useful Improvements in Pin-Feather-Picking Machines; and I do hereby declare the following to be a full, clear, and exact description of the invention, such as will enable others skilled in the art to which it appertains to make and use the same.

My invention relates to feather picking machines and is in the nature of a modification of the feather picking machine disclosed and broadly claimed by me in a companion application executed of even date herewith, and entitled "Feather picking machine."

The drawings of my said companion application disclose a feather picking machine particularly adapted for picking down and the feathers from a fowl or bird, while the present application is directed particularly to a device for picking the pin feathers from the bird after the down and feathers proper are removed therefrom.

In the drawings I have illustrated a pin feather picking machine, which, in actual practice, has been tried and found efficient for the purposes had in view. In the drawings, like characters indicate like parts throughout the several views.

Referring to the drawings:

Fig. 2 is a bottom plan view of the picking device proper;

Fig. 3 is a section taken on the line $x^3$ $x^3$ of Fig. 2;

Fig. 4 is an outer end elevation of the parts shown in Fig. 3;

Fig. 5 is a detail in plan showing the main picking roller and its shaft connections;

Fig. 6 is a plan view of the parts shown in Fig. 5 with the face-forming portion of the main roller removed;

Fig. 7 is an end elevation of the auxiliary picking roller;

Fig. 8 is a section on the line $x^8$ $x^8$ of Fig. 7.

Fig. 9 is a section on the line $x^9$ $x^9$ of Fig. 5; and

Figs. 10 and 11 are views, respectively, in elevation and plan showing a detachable roller supporting bar removed from the casing.

Figure 1:
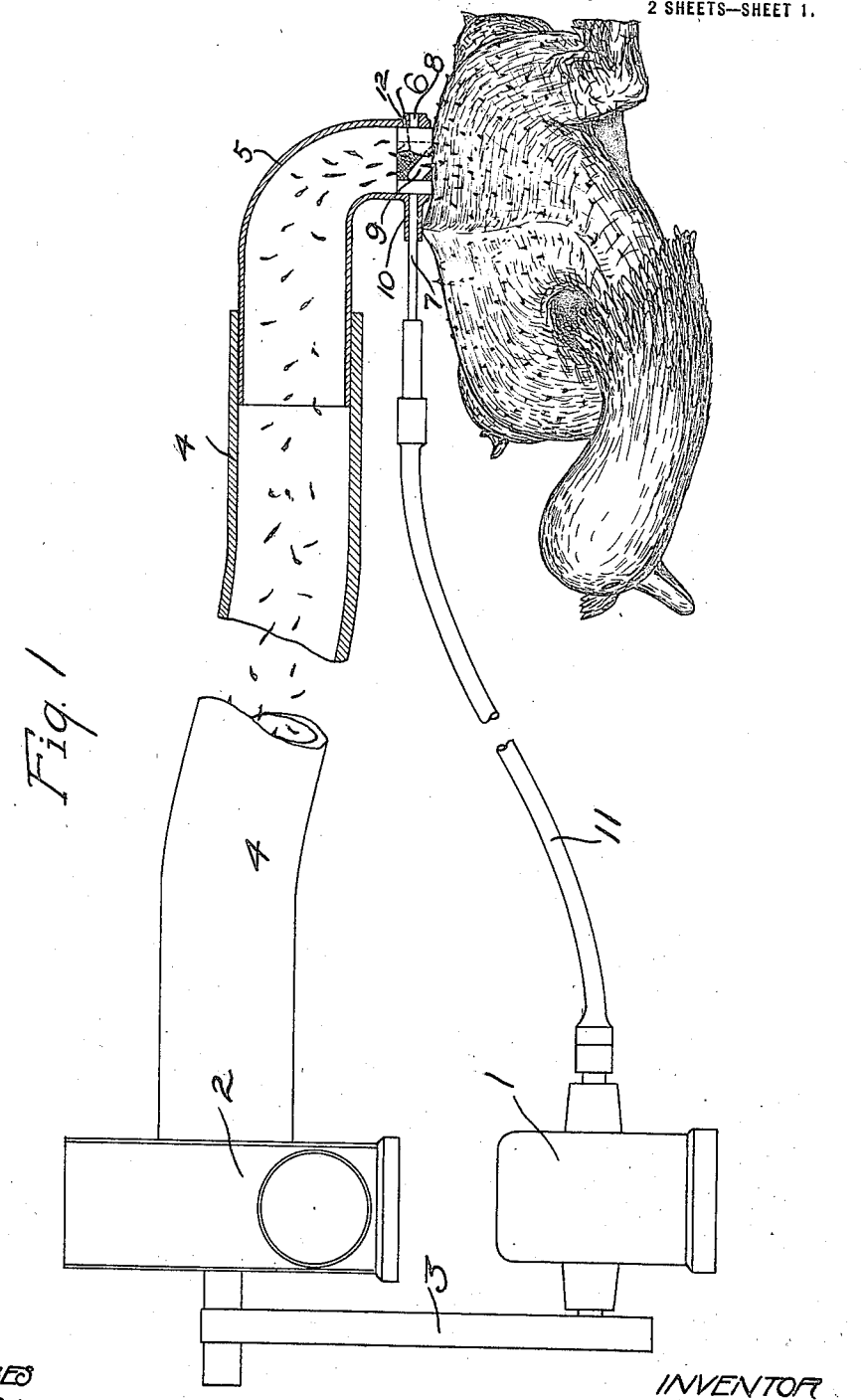
Figure 1 is a view partly in side elevation and partly in vertical section showing the device and illustrating the use thereof to pick the pin feathers from a duck.

In Fig. 1, the numeral 1 indicates an electric motor, which will preferably be used as a source of motive power. The numeral 2 indicates a suction fan which is driven from the motor through a belt 3 and coöperating pulleys. The said motor and fan are local or stationary. The receiving eye of the fan 2 is connected by a large flexible suction tube 4, to the tubular stem of a casing 5 that has an open bottom or mouth in which is journaled a pair of frictionally engaged coöperating rollers. One of these rollers is positively driven and is herein treated as the main roller, and this roller, as preferably constructed, comprises a tubular metal shell 6 secured to axially spaced heads of shaft sections 7 and 8. The peripheral surface of the roller shell 6 is knurled, and it is formed with spiral air intake passages 9, the edges of which are sharpened, preferably to substantially knife edges. The shaft section 7 is journaled in a suitable bearing 10 on the casing, and it is connected, by a flexible driving shaft 11 of any suitable or well known construction, to the armature shaft of the motor 1. The short shaft section 8 is journaled in a bearing bar 12 that is detachably, but rigidly secured to the casing 5, by means of screws 13 or other suitable devices. The so-called auxiliary roller which works in frictional contact with the main roller 6, is preferably constructed and involves a small shaft 14 and a rubber facing 15, which latter runs in frictional contact with the knurled surface of the roller 6 so that it will be driven thereby. The shaft 14 of the said auxiliary roller is journaled in the above noted bearing 10 and bearing bar 12.

For an important purpose, small depressing bars 16 are secured at their ends to the lower portion of the casing 5 and extend immediately under the coöperating picking rollers 6 and 15. These bars are adapted to engage the skin of the bird and hold the same firmly down while the pin feathers are being pulled by the coöperating action of the picking rollers, thus preventing tearing of the skin.

Here it is important to note that the two coöperating picking rollers close, or approximately close, the mouth of the casing 1, so that all, or nearly all, of the air drawn into the casing must come through the slots or passages in the so-called main picking roller. This feature is especially required in a machine for picking pin feathers.

The knurled surface on the slotted so-called main roller also greatly assists in picking up the small pin feathers, and it further insures positive rotation of the coöperating auxiliary roller.

By providing one of the picking rollers with an oblique or spiral air passage extended diametrically through the same, a continuous flow of air into the casing is provided for, even when the said roller is provided with a single air passage of such arrangement.

When the motor is in action, the picking rollers 6 and 15 will be rotated in a direction to carry the pin feathers upward between them into the casing 5, and at the same time, the suction fan 2, being thrown into action, will draw a strong current upward through the slots 9 of the main roller 6, through the casing 5 and flexible tube 4 of the fan, and from thence, outward through the discharge tube of the fan. The picking rollers are made of as small diameter as practicable, so that they will pick up and pull very short pin feathers. Furthermore, the picking up and pulling of the pin feathers is very greatly facilitated by the sharp edges along the walls of the slots 9 in the main roller 6, which edges have a scraping action very analogous to that produced by a knife drawn laterally over the pin feathers. When the pin feathers are pulled, they are drawn immediately through the slots 9 of the roller 6 and into the casing, from whence they are drawn, as already noted.

In practice, I have found that the pin feathers may be picked clean from a fowl or bird without damaging the skin thereof.

What I claim is:

1. A pin feather picking machine comprising a casing having a mouth opening, a pair of coöperating picking rollers mounted in and substantially closing the mouth opening of said casing, one of the rollers having air passages through which the air is drawn into said casing, connections to one of said picking rollers for rotating the same, and means for producing a partial vacuum or suction in said casing.

2. A pin feather picking machine comprising a casing having a mouth opening, a pair of coöperating picking rollers mounted in and substantially closing the mouth opening of said casing, one of the rollers having air passages through which the air is drawn into said casing, connections to one of said picking rollers for rotating the same, means for producing a partial vacuum or suction in said casing, the rollers having air passages also having a knurled peripheral surface, and the coöperating rollers having pliable faces.

3. A pin feather picking machine comprising a casing having a mouth opening, a pair of coöperating picking rollers mounted in and substantially closing the mouth opening of said casing, one of the rollers having air passages through which the air is drawn into said casing, connections to one of said picking rollers for rotating the same, means for producing a partial vacuum or suction in said casing, and small presser bars secured to said casing and extending immediately under the said picking rollers for engaging with the skin of the bird.

4. A pin feather picking machine comprising a casing having a mouth opening, coöperating main and auxiliary picking rollers mounted in and approximately closing the mouth opening of said casing, the said main roller having an oblique air passage extending diametrically therethrough.

5. A pin feather picking machine comprising a casing having a mouth opening, coöperating main and auxiliary picking rollers mounted in and approximately closing the mouth opening of said casing, the said main roller having an oblique air passage extending diametrically therethrough, and presser bars secured to said casing and extending immediately under the said picking rollers.

In testimony whereof I affix my signature in presence of two witnesses.

OTTO G. RIESKE.

Witnesses:
A. S. Bow,
J. Rothwell.